(12) United States Patent
Bargheer et al.

(10) Patent No.: US 7,075,034 B2
(45) Date of Patent: Jul. 11, 2006

(54) AIR SUPPLYING DEVICE FOR VEHICLE SEAT WITH AIRSTREAM ADJUSTMENT RESPONSIVE TO MOTOR VEHICLE VELOCITY

(75) Inventors: Claudio Bargheer, Holzgerlingen (DE); Dietmar Hartmann, Deckenpfronn (DE); Karl Pfahler, Stuttgart (DE); Lothar Renner, Nufringen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/517,651

(22) PCT Filed: Apr. 26, 2003

(86) PCT No.: PCT/EP03/04382

§ 371 (c)(1),
(2), (4) Date: Jun. 30, 2005

(87) PCT Pub. No.: WO03/106215

PCT Pub. Date: Dec. 24, 2003

(65) Prior Publication Data

US 2005/0238339 A1    Oct. 27, 2005

(30) Foreign Application Priority Data

Jun. 12, 2002  (DE) .............................. 102 26 008

(51) Int. Cl.
*H05B 3/00* (2006.01)
*F24H 3/00* (2006.01)
*A47C 31/00* (2006.01)

(52) U.S. Cl. ..................... 219/202; 392/379; 219/217; 454/120; 297/217.1; 297/180.12

(58) Field of Classification Search ................ 219/202, 219/490, 217; 392/360–369, 379–385; 297/180.1, 297/180.12, 217.1; 165/202, 41; 237/12.3 A; 454/120

See application file for complete search history.

(56) References Cited

U.S. PATENT DOCUMENTS

| | | | | |
|---|---|---|---|---|
| 5,588,481 A | * | 12/1996 | Dziama et al. ................ | 165/42 |
| 5,653,386 A | * | 8/1997 | Hennessee et al. .... | 237/12.3 B |
| 5,934,748 A | * | 8/1999 | Faust et al. ............ | 297/180.12 |
| 6,105,667 A | * | 8/2000 | Yoshinori et al. ........... | 165/202 |
| 6,186,592 B1 | * | 2/2001 | Orizaris et al. ........ | 297/180.12 |

(Continued)

FOREIGN PATENT DOCUMENTS

DE    92 01 474.7    5/1992

(Continued)

*Primary Examiner*—John A. Jeffery
(74) *Attorney, Agent, or Firm*—Crowell & Moring LLP

(57) ABSTRACT

An air supply device is provided for a vehicle seat of an open-top motor vehicle having at least one air outflow opening which is provided in the upper region of the vehicle seat and via which an airstream can be applied to the head area, shoulder area and nape area of the sitting vehicle occupant in order to reduce undesired draft phenomenon. The airstream can be regulated by way of a control device. In order to provide improved comfort for the sitting vehicle occupant when driving with the top open, the airstream is adjusted, when the air supply device is switched on, by way of the control device as a function of an automatically sensed external parameter value or of a predefined value selectable by the sitting vehicle occupant, to an assigned basic value, starting from which the further adjustment of the airstream is carried out as a function of an automatically sensed further parameter value.

23 Claims, 2 Drawing Sheets

U.S. PATENT DOCUMENTS 6,786,545 B1 * 9/2004 Bargheer et al. ......... 297/217.1
6,892,807 B1 * 5/2005 Fristedt et al. .............. 165/202

FOREIGN PATENT DOCUMENTS

| | | |
|---|---|---|
| DE | 196 54 370 | 1/1998 |
| DE | 199 10 390 | 9/1999 |
| DE | 199 49 935 | 11/2000 |
| DE | 201 04 173 | 7/2001 |
| DE | 100 47 754 | 4/2002 |
| DE | 100 54 008 | 5/2002 |
| DE | 100 54 009 | 5/2002 |
| EP | 1 203 681 | 5/2002 |
| GB | 2322936 * | 9/1998 |
| JP | 56-31813 * | 3/1981 |
| JP | 61-247508 * | 11/1986 |
| JP | 7-304321 * | 11/1995 |

* cited by examiner

AIR SUPPLYING DEVICE FOR VEHICLE SEAT WITH AIRSTREAM ADJUSTMENT RESPONSIVE TO MOTOR VEHICLE VELOCITY

BACKGROUND AND SUMMARY OF THE INVENTION

The invention relates to an air supply device for a vehicle seat of an open-top motor vehicle having at least one air outflow opening which is provided in the upper region of the vehicle seat and via which an airstream can be applied to the head area, shoulder area and nape area of the sitting vehicle occupant in order to reduce undesired draught phenomenon, and wherein the airstream can be regulated by means of a control device.

DE 92 01 474 U1 discloses such an air supply device having at least one air outflow opening which is provided in the upper region of the vehicle seat and via which an airstream can be applied to the head area, shoulder area and nape area of the sitting vehicle occupant in order to reduce undesired draught phenomena. The air supply device is supplied with air which is taken in during driving via inflow cross sections and is fed to the air outflow opening through lines and ducts by means of dynamic pressure or a blower.

The object of the invention is to provide an air supply device of the type mentioned at the beginning with improved comfort for the sitting vehicle occupant when driving with the top open.

This object is achieved according to the invention by means of an air supply device for a vehicle seat of an open-top motor vehicle having an air supply device and at least one air outflow opening of the air supply device which is provided in an upper region of the vehicle seat, via which an airstream generated by a blower can be applied to a sitting vehicle occupant head area, shoulder area and nape area in order to reduce undesired draught phenomenon, wherein the airstream can be regulated by means of a control device of the air supply device, wherein, when the blower of the air supply device is switched on, the airstream is adjusted by means of the control device as a function of a predefined value, selectable by the sitting vehicle occupant, to an assigned basic value, starting from which the further adjustment of the airstream is carried out as a function of the velocity of the motor vehicle. Advantageous refinements of the invention are given in the subclaims.

According to the invention, after the air supply device has been switched on, the airstream is adjusted to a basic value by means of the control device as a function of the automatically sensed external parameter value or of a manually selected predefined value. The automatically sensed external parameter value is to be understood here in particular as the external temperature on the basis of which the airstream is adapted to an assigned temperature and intensity. This is carried out in particular by controlling the heating power of a heating element and the rotational speed of a blower. The predefined value which can be selected by the sitting vehicle occupant is to be understood in particular as the adjustment of a value by means of a regulating device in the passenger compartment of the motor vehicle. As a result, a basic value is either adjusted automatically or as a function of the sitting vehicle occupant, and said basic value can be adapted conveniently and easily to, for example, at least approximately constant conditions such as the external temperature. The further adjustment of the airstream on the basis of the aforesaid basic value is then carried out as a function of an automatically sensed further parameter value, for example the velocity of the motor vehicle, which changes very frequently in the driving mode of the motor vehicle, as a result of which it may be necessary, for example, to permanently adapt, for example, the intensity or heat of the airstream.

It has proven effective, for example, to graduate the basic value of the airstream in three power levels, the optimum level of which can be selected by the sitting vehicle occupant.

Further advantages features and details of the invention emerge from the following description of preferred exemplary embodiments as well as with reference to the drawings.

DETAILED DESCRIPTION OF THE DRAWINGS

Figure 1:
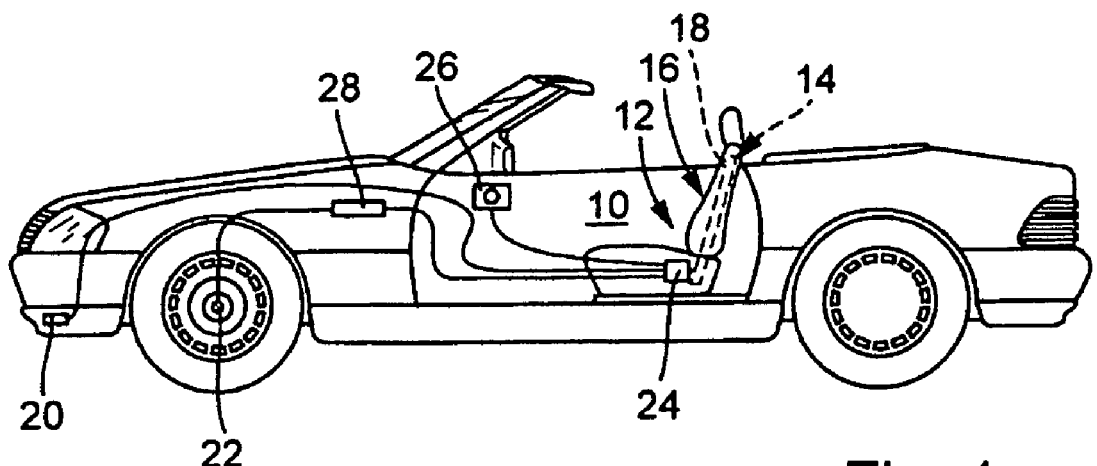
FIG. 1 is a schematic side view of an open-top motor vehicle with a vehicle seat with an associated air supply device according to the invention.

FIG. 1 is a schematic side view of an open-top motor vehicle in whose passenger cell 10 a row of seats with two vehicle seats 12 is arranged. An air supply device 14 which is illustrated only schematically in FIG. 1 and is explained in more detail below with reference to the further figures is integrated into each of the two vehicle seats 12, an air outflow opening 18 of the air supply device 14 being represented at the level of the upper region of the backrest 16 of the seat 12. An airstream which can be regulated can be supplied via this air outflow opening 18 to the head area, shoulder area and nape area of the sitting vehicle occupant, in order to reduce undesired draught phenomenon which is explained in more detail below.

The air supply device 14 is connected here both to a sensor 20 for sensing the external temperature and to a sensor 22 for sensing the velocity. The two sensors 20, 22 are connected to a control device 24 which is arranged, for example, inside the respective seat 12 and by means of which the airstream emerging from the air outflow opening 18 is controlled in a way which will be described below. In addition, a regulating device 26, which is connected to the control device 24 and by means of which the sitting vehicle occupant can carry out manual adjustment of the airstream, which is also described below, is provided in the passenger compartment of the motor vehicle. In the exemplary embodiment shown here, the velocity is sensed by an ABS control device 28 which is present in any case and which converts the instantaneous velocity into an electronic signal and transmits it to the control device 24. The external temperature can be sensed by a temperature sensor 20, which is present in any case, in order to display the temperature in the cockpit, the temperature being converted into an electronic signal and transmitted to the control device 24 in the seat 12.

Figure 2:
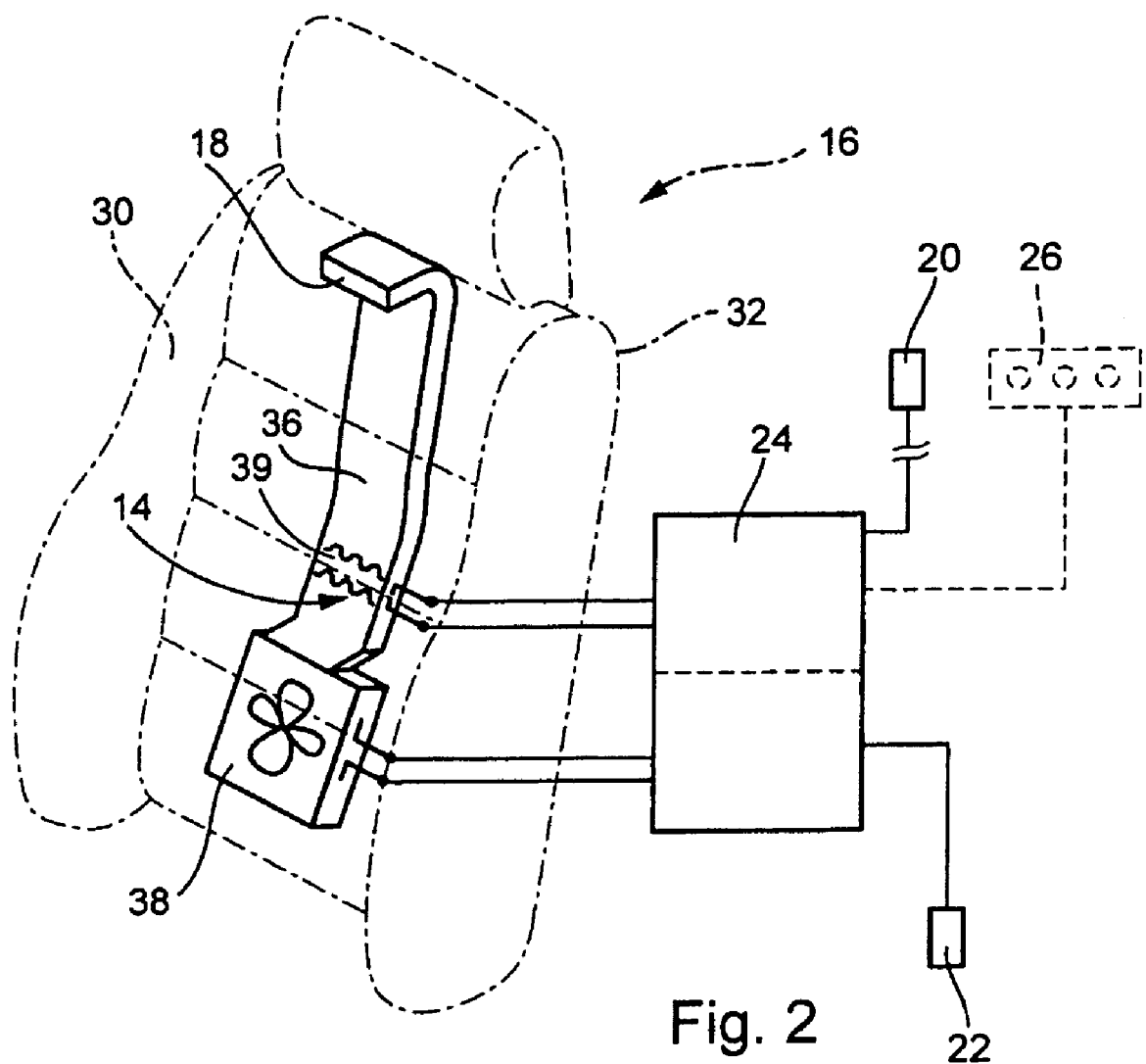
FIG. 2 is a schematic perspective view of parts of the backrest of the vehicle seat, into which backrest the air supply device is integrated.

FIG. 2 illustrates, in a schematic perspective view, parts of the backrest 16 of the seat 12 according to FIG. 1, into which backrest 16 the air supply device 14 is integrated. A backrest frame 30 and a rear trim 32 of the backrest 16 of the seat 12 can be seen. A duct arrangement 36 of the air supply device 14 is arranged inside the backrest 16. Connected upstream of the duct arrangement 36 is a blower 38 which is accommodated in a housing and whose air inlet is on the rear side of the backrest 16. In addition, a heating element 39, which is connected downstream of the blower 38 and which can be controlled by means of the control device 24 and with which the airstream of the air supply device 14 can be conditioned is arranged inside the duct arrangement 36. In the region of the headrest (not shown in FIG. 2), the duct arrangement 36 opens into the air outflow opening 18 through which the conditioned airstream emerges in the direction of the head area, shoulder area and the nape area of the sitting vehicle occupant in order to considerably reduce draught phenomenon occurring when driving with an open top. The air outflow opening 18 ends approximately flush at the surface of the front side of the headrest and is integrated therein.

At the input end, the control device 24 senses the external parameter value which has been automatically sensed by the external temperature sensor 20 and/or the predefined value which has been transmitted by the regulating device 26. The external parameter value and/or the predefined value are used here, as is apparent from FIG. 4, to adjust a low, medium or high basic value G1–G3 of the airstream L. This basic value G1–G3 of the airstream L is determined by an assigned fan speed n of the blower 38 and an assigned heating power h of the heating element 39. By means of the regulating device 26 which is indicated here by dashed lines, the sitting vehicle occupant can also adjust a corresponding basic value G1–G3, for example if no automatic adjustment is provided by means of the external predefined value or if the airstream L which is preset by means of the external predefined value is too low or too high for the sitting vehicle occupant.

Figure 4:
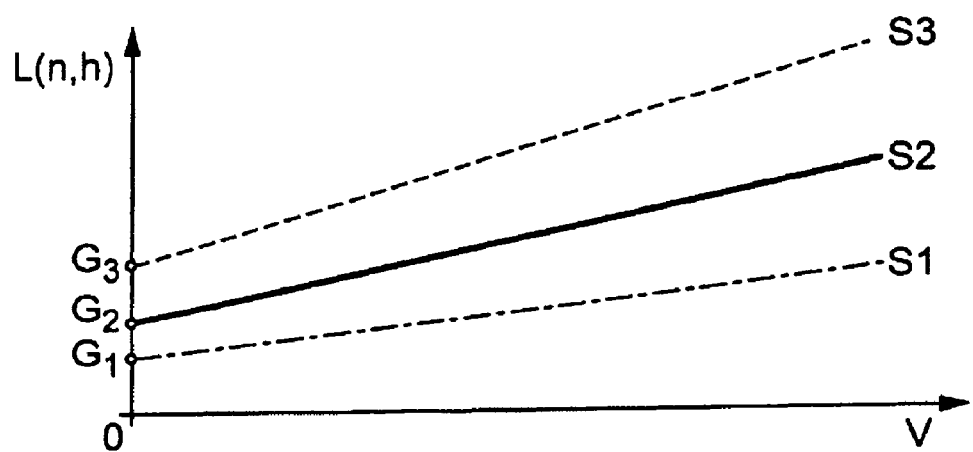
FIG. 4 is a diagram in which the airstream with the fan speed of the blower and the heating power of the heating element are represented as a function of the velocity of the motor vehicle.

As is apparent from considering FIGS. 2 and 4 together, the further adjustment of the airstream L (FIG. 4) starting from the basic value G1–G3 described above is carried out as a function of the velocity V which is sensed automatically by the sensor 22. Starting from the basic values G1–G3, the further adjustment of the airstream L is accordingly carried out along the control curves S1–S3. Since the turbulence in the head area and nape area of the passenger becomes greater as the velocity V increases, the airstream L correspondingly increases—as is apparent from FIG. 4—starting from the basic value G1–G3 which has been set, by virtue of the fact that the blower 38 feeds more air as a result of an increasing fan speed, and the heating power of the heating element 39 is also increased by the control device 24 in accordance with the greater amount of air which is fed. Accordingly, the heating power of the heating element 39 is reduced by the control device 24 as the velocity drops. In accordance with the control curves S1–S3, a linear rise in the airstream L occurs here as the velocity increases. Equally, a non-linear rise and correspondingly a curved profile of the control curves S1–S3 would be conceivable. It would also be conceivable, when the external parameter value changes, to change the fan speed or the heating power, or to change both values. The external parameter value which is sensed automatically by means of the external temperature sensor 20 and/or the predefined value which is transmitted by the control device 26 is checked at regular intervals inside the control device 24. If, for example, the external temperature is changed beyond a specific value, a different basic value G1–G3 of the airstream L is set by means of the control device 24. Of course, in this context it is conceivable to adopt a division into more than three basic values.

Figure 3:
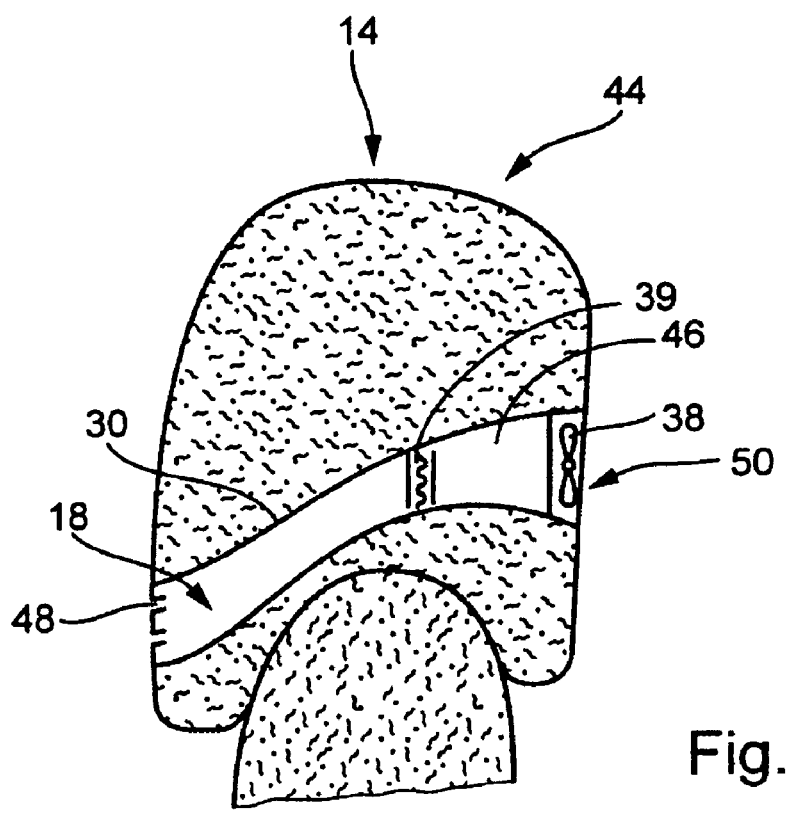
FIG. 3 is a schematic sectional view of the headrest of a vehicle seat, into which headrest the air supply device is integrated.

FIG. 3 is a schematic sectional view of the headrest 44 of a vehicle seat, into which headrest 44 the air supply device 14 is integrated according to a further embodiment. The air supply device 14 comprises a pipe duct 46 which extends from the front side as far as the rear side of the headrest 44 and runs in the longitudinal direction of the vehicle and in a further lower region of the headrest 44. The pipe duct 46 is preferably manufactured from a soft plastic or from rubber. A rear part of the pipe duct 46 forms an air inlet 50 here on the intake side of the blower 38 which is formed here as an axial fan, and a front part of the air duct 46 opens at the front side of the headrest 44 in the region of the air outflow opening 18. The heating element 39 is arranged inside the pipe duct 46, approximately in the center of the headrest 44. In order to conduct the warm air in an optimum way to the head area, nape area and shoulder area of the sitting vehicle occupant, an air conducting device with a plurality of adjustable air directing vanes 48 is arranged in the region of the outlet opening 18 of the air outlet duct 46. The airstream L is regulated by means of the control device 24 by means of the fan speed n of the blower 38 and the respectively assigned heating power h of the heating element 39 in a way which is identical to the first exemplary embodiment, said regulating process being specifically carried out again as a function of the external temperature or the velocity. The control device 24 is not shown in FIG. 3 since the means of controlling the heating element 39 and the means of controlling the blower 38 are identical to the first exemplary embodiment.

The invention claimed is:

1. A vehicle seat of an open-top motor vehicle having an air supply device and at least one air outflow opening of the air supply device, which is provided in an upper region of the vehicle seat, via which an airstream generated by a blower can be applied to a sitting vehicle occupant head area, shoulder area and nape area in order to reduce undesired draught phenomenon,
   wherein the airstream can be regulated by means of a control device of the air supply device,
   wherein, when the blower of the air supply device is switched on, the airstream is adjusted by means of the control device as a function of a predefined value, selectable by the sitting vehicle occupant, to an assigned basic value, starting from which the further adjustment of the airstream is carried out as a function of the velocity of the motor vehicle, and
   wherein said control device changes said assigned basic value depending on a sensed external temperature.

2. The vehicle seat as claimed in claim 1, wherein the basic value of the airstream is determined by an assigned fan speed of the blower and an assigned heating power of a heating element.

3. The vehicle seat as claimed in claim 2, wherein during the further adjustment of the airstream, the fan speed of a blower can be adjusted as a function of the velocity of the motor vehicle.

4. The vehicle seat of claim 3, wherein the external parameter value for adjusting the basic value is newly determined at regular intervals during the driving operation.

5. The vehicle seat of claim 2, wherein the external parameter value for adjusting the basic value is newly determined at regular intervals during the driving operation.

6. The vehicle seat as claimed in claim 1, wherein during the further adjustment of the airstream, the fan speed of a blower can be adjusted as a function of the velocity of the motor vehicle.

7. The vehicle seat of claim 6, wherein the external parameter value for adjusting the basic value is newly determined at regular intervals during the driving operation.

8. The vehicle seat of claim 1, wherein the basic value of the airstream can be adjusted in one of a plurality of power levels.

9. The vehicle seat of claim 8, wherein during the further adjustment of the airstream the fan speed of a blower can be adjusted as a function of the velocity of the motor vehicle.

10. The vehicle seat of claim 1, wherein the external parameter value for adjusting the basic value is newly determined at regular intervals during the driving operation.

11. The vehicle seat as claimed in claim 1, wherein the basic value of the airstream can be adjusted in one of a plurality of power levels.

12. The vehicle seat of claim 11, wherein the external parameter value for adjusting the basic value is newly determined at regular intervals during the driving operation.

13. The vehicle seat as claimed in claim 1, wherein during the further adjustment of the airstream the fan speed of a blower can be adjusted as a function of the velocity of the motor vehicle.

14. The vehicle seat of claim 13, wherein the external parameter value for adjusting the basic value is newly determined at regular intervals during the driving operation.

15. The vehicle seat as claimed in claim 1, wherein the external parameter value for adjusting the basic value is newly determined at regular intervals during the driving operation.

16. An air supply arrangement for supplying a draught reducing airstream to a vehicle occupant neck area during driving of an open top motor vehicle comprising:

an airstream supply system operable to blow an airstream adjacent the vehicle occupant neck area, manually operable selection means for selecting one of a plurality of basic airstream parameters, and a control means operable to further adjust the selected one of the plurality of basic airstream parameters as a function of vehicle velocity and change the parameter selected depending on a sensed external temperature.

17. An air supply arrangement according to claim 16, wherein said basic airstream parameters include airstream velocity and airstream temperature.

18. An air supply arrangement according to claim 17, wherein the control means is operable to change the velocity of the airstream linearly as a function of the vehicle speed.

19. An air supply arrangement according to claim 17, wherein the control means is operable to change the velocity of the airstream non-linearly as a function of the vehicle speed.

20. An air supply arrangement according to claim 17, wherein the control means is operable to change the temperature of the airstream linearly as a function of the vehicle speed.

21. An air supply arrangement according to claim 17, wherein the control means is operable to change the temperature of the airstream non-linearly as a function of the vehicle speed.

22. An air supply arrangement according to claim 17, wherein the control means is operable to change the temperature and the velocity of the airstream as a function of the vehicle speed.

23. An air supply arrangement according to claim 16, wherein the airstream supply system includes a blower and a heater, and wherein said selection means and control means are operable to select and control the blower and heater.

* * * * *